US006964997B2

(12) United States Patent
Kikuchi et al.

(10) Patent No.: US 6,964,997 B2
(45) Date of Patent: Nov. 15, 2005

(54) MOLDED ARTICLE FOR INTERIOR PARTS OF A CAR

(75) Inventors: Osamu Kikuchi, Sagamihara (JP); Hiroki Imada, Yamato (JP); Michio Ono, Kawasaki (JP)

(73) Assignees: Nissan Motor Co., Ltd., Kanagawa (JP); SunAllomer, Ltd., Tokyo (JP)

( * ) Notice: Subject to any disclaimer, the term of this patent is extended or adjusted under 35 U.S.C. 154(b) by 257 days.

(21) Appl. No.: 10/620,168

(22) Filed: Jul. 15, 2003

(65) Prior Publication Data

US 2004/0044107 A1 Mar. 4, 2004

(30) Foreign Application Priority Data

Jul. 19, 2002 (JP) ...................................... 2002-210655

(51) Int. Cl.$^7$ .............................. C08F 8/00; C08L 9/00; C08L 23/00; C08L 23/04; C08L 25/02
(52) U.S. Cl. ..................... 525/191; 525/232; 525/240; 525/241; 524/401; 524/451; 524/500; 524/515
(58) Field of Search ................................ 525/191, 232, 525/240, 241; 524/401, 451, 500, 515

(56) References Cited

U.S. PATENT DOCUMENTS

| | | | | |
|---|---|---|---|---|
| 5,552,482 A | * | 9/1996 | Berta | .......................... 525/88 |
| 6,498,214 B2 | * | 12/2002 | Laughner et al. | ........... 525/191 |
| 6,590,038 B2 | * | 7/2003 | Yu et al. | ..................... 525/240 |
| 6,689,841 B2 | * | 2/2004 | Jung et al. | .................. 525/240 |
| 6,696,520 B1 | * | 2/2004 | Pellegatti et al. | ............. 525/88 |

FOREIGN PATENT DOCUMENTS

| | | | | |
|---|---|---|---|---|
| JP | 57008235 A | 1/1982 | ........... C08L/23/16 |
| JP | 57073034 A | 5/1982 | ........... C08L/23/10 |
| JP | 2001288331 A | 10/2001 | ........... C08L/53/00 |

OTHER PUBLICATIONS

Characterization of Microstructure and Fracture Behavior of Polypropylene/Elastomer Blends Containing Small Crystal in Elastomeric Phase, Rakao Nomura, et al., Journal of Applied Polymer Science, vol. 55, 1307–1315 (1995).

* cited by examiner

*Primary Examiner*—Nathan M. Nutter
(74) *Attorney, Agent, or Firm*—Norris McLaughlin & Marcus PA

(57) ABSTRACT

The present invention relates to interior parts of a car comprising a new propylene resin composition. The present resin composition has good molding abilities and a good balance of physical properties as well as a good appearance, lower gloss and scratch resistance. Specifically, the present invention relates to a molded article for interior parts of a car comprising a polypropylene resin composition comprising the following components; a crystalline homopolypropylene having MFR of 500 to 3,000 g/10 min.; a polypropylene consisting of a crystalline homopolypropylene and an ethylene-propylene copolymer rubber having 45 to 80% by mass of a ethylene content; a polypropylene consisting of a crystalline homopolypropylene and an ethylene-propylene copolymer rubber having 25% by mass or more to below 45% by mass of a ethylene content; and an ethylene-α-olefin copolymer rubber.

20 Claims, No Drawings

MOLDED ARTICLE FOR INTERIOR PARTS OF A CAR

TECHNICAL FIELD OF THE INVENTION

The present invention relates to a new propylene resin composition and more particularly relates to a new molded article for interior parts of a car comprising said composition. Specifically, the present resin composition has good molding (injection molding, injection compression molding and gas-assist molding) abilities and a good balance of physical properties, and in addition a molded article comprising the resin composition has a good appearance, lower gloss and scratch resistance.

BACKGROUND OF THE INVENTION

Polypropylene resin has a good processing property, antimedicament property, chemical resistance, weather resistance and electrical performance. Thus polypropylene resin is usually used in a broad range of technical fields including auto parts, electric appliances and office automation equipment, as well as all kinds of injection molded articles, blow molded articles, vacuum or pressed air molded articles, film or sheet. Among these fields, the polypropylene resin used in the field of interior parts of a car can also be used in the fields where a higher balance of physical properties such as stiffness and a high-impact property are required, by adding polypropylene with a filler or a rubber.

Recently, polypropylene resin used in the field of interior parts of a car is required to have an enhanced impact strength. In order to enhance impact strength, the molecular weight of polypropylene moiety or rubber moiety has been increased. However, by increasing such a molecular weight, flowability of a melted resin is reduced when polypropylene resin composition is injection molded, in particular when a large injection molded article such as an instrument panel or a bumper is molded. Accordingly, there is a problem in which a flow mark or weldline appears on the surface of the obtained article to devalue the article. Although a defective portion can be covered by a mat painting on the whole of or part (flow marked or weldlined part) of the article, a cost increase would be inevitable. Therefore, requests for a material in which the above-mentioned problem does not occur and which does not need to be painted is increasing rapidly.

Recently, in interior parts of a car such as an instrument panel, in particular an article with embossed pattern, lower gloss material is also required in order to provide lived-in-feeling and inhibition of reflectance of sunlight to improve safety.

However, one defect of lower gloss articles is that the articles are easily scratched when such articles contact each other when the articles are being carried, when the articles come in contact with clothes such as work gloves while assembling parts, or when the articles come in contact with a metal such as that of a buckle of a seat belt. Another defect of such articles is that any scratch thereon is usually outstanding because of the lower gloss. Such problem with respect to scratching is especially remarkable in the unpainted article as mentioned above.

As for a method for improving the appearance of a molded article by preventing the aforesaid weldline and a method for obtaining lower glossing, a method for using a crystalline ethylene-propylene copolymer characterized by its molecular weight distribution and relaxation time has been known [please see, for example, Japanese Patent Unexamined Published Applications (hereinafter referred to as "J.P. KOKAI") Nos. 9-71714 and 9-71619]. As for a method for improving the appearance of a molded article by preventing the aforesaid flow mark and a method for obtaining a uniform gloss, a method for using an ethylene-propylene copolymer characterized in obtaining a melting viscosity at a specific frequency has been proposed (J.P. KOKAI No. 9-328526).

Furthermore, as for improvement of scratch resistance, a technique for adding a specific polyethylene (J.P. KOKAI No. 57-73034), a technique for using a filler having a specific particle size (J.P. KOKAI No. 57-8235) and a technique for reducing a frictional coefficient and increasing the hardness of the surface of a molded article by adding a high crystalline polyethylene with a lubricant such as a fatty acid amide to improve its scratch resistance (J.P. KOKAI No. 2001-288331) have been known.

However, while these known methods and polypropylene resin compositions obtained therefrom somewhat improve the appearance and the scratch resistance property of a molded article, they are not sufficient for using on interior parts of a car. Especially, considering that the requirements for interior parts of a car are that it has both a low gloss and a good physical balance, it is seen that these known methods and polypropylene resin compositions obtained therefrom can not meet such requirements sufficiently.

SUMMARY OF THE INVENTION

The first object of the present invention is to provide a molded article for interior parts of a car using a new propylene resin composition having good molding (injection molding, injection compression molding and gas-assist molding) abilities and a good balance of physical properties, as well as good appearance, lower gloss and scratch resistance.

After conducting intensive investigations for the purpose of solving the above-described problems regarding the prior art, the inventors have found that the problems can be solved by using the following polypropylene resin composition as interior parts of a car. The present invention has been completed on the basis of this finding.

That is, as for one embodiment, the present invention relates to a molded article for interior parts of a car comprising a polypropylene resin composition comprising the following components (A) to (D) wherein a total amount of the components (A) to (D) is 100% by mass or less:

Polypropylene (A):
  5.0 to 30% by mass of a crystalline homopolypropylene having an MFR of 500 to 3,000 g/10 min. determined by a melt flow rate measurement at 230° C. under 21.6 N load and a fraction soluble in boiling p-xylene of 6.0% by mass or less;

Polypropylene (B):
  10 to 50% by mass of a polypropylene comprising a crystalline homopolypropylene ($B^1$) and an ethylene-propylene copolymer rubber ($B^2$), said ethylene-propylene copolymer rubber ($B^2$) having an intrinsic viscosity of 4.0 to 7.0 dl/g at 135° C. in decalin and a content of ethylene of 45% by mass to 80% by mass, and said polypropylene (B) comprising said ethylene-propylene copolymer rubber ($B^2$) in an amount of at least 10% by mass;

Polypropylene (C):
  5.0 to 30% by mass of a polypropylene comprising a crystalline homopolypropylene ($C^1$) and an ethylene-propylene copolymer rubber ($C^2$) said ethylene-propylene copolymer rubber ($C^2$) having an intrinsic viscosity of 5.0 to 10 dl/g at 135° C. in decalin and a content of ethylene of from 25% by mass or more to below 45% by mass, and said polypropylene (C) comprising said ethylene-propylene copolymer rubber ($C^2$) in an amount of at least 10% by mass;

Ethylene-α-Olefin Copolymer Rubber (D):

5.0 to 40% by mass of an ethylene-α-olefin copolymer rubber having an MFR of 0.1 to 1.0 g/10 min. as determined by a melt flow rate measurement at 230° C. and 21.6 N load, a content of ethylene of 50% by mass to 80% by mass, and a comonomer sequencing distribution of 1.0 to 2.0 determined by $^{13}$C-NMR.

As for the other embodiment, the present invention relates to a molded article for interior parts of a car comprising the polypropylene resin composition further containing an inorganic filler (E) and/or a lubricant(F), in addition to the above mentioned (A) to (D).

The preferred embodiments of the present invention are described as follows.

DESCRIPTION OF THE EMBODIMENTS (1) Polypropylene Resin Composition

The polypropylene resin composition of the present invention contains Polypropylene (A) of a crystalline homopolypropylene; Polypropylene (B) containing a crystalline homopolypropylene and an ethylene-propylene copolymer rubber; Polypropylene (C) containing a crystalline homopolypropylene and an ethylene-propylene copolymer rubber, which copolymer rubber has a property different from that of the ethylene-propylene copolymer rubber used in Polypropylene (B); Ethylene-α-olefin copolymer rubber (D) as an essential component. The polypropylene resin composition of the present invention further contains Inorganic filler (E), Lubricant (F), Elastomer (G) and/or Other polymer components (H), and Other components (I) as an optional component. These components are specifically described below.

<Polypropylene (A)>

The polypropylene used for the component (A) of the present invention is not particularly limited so far as it is a crystalline homopolypropylene. Preferably, the polypropylene is isotactic.

The crystalline homopolypropylene of the component (A) suitably has a melt flow rate (MFR) of 500 to 3,000 g/10 min. as determined at 230° C. under 21.6 N load (JIS K7210), preferably 800 to 2,500 g/10 min., more preferably 1,000 to 2,000 g/10 min. When the MFR is 500 g/10 min. or more, it is preferred that sufficient flowability be obtained and a bad appearance such as a weld and flow mark be prevented. When the MFR is 3,000 g/10 min. or less, it is also preferred that a high-impact property not be reduced.

In the crystalline homopolypropylene of the component (A), a fraction soluble in boiling p-xylene is suitably 6.0% by mass or less, preferably 3.0% by mass or less, more preferably 0.1 to 2.0% by mass. When the fraction soluble in boiling p-xylene is 6.0% by mass or less, it is preferred that a molded article to be used as interior parts of a car has sufficient stiffness.

One or more crystalline homopolypropylenes can be used so far as the crystalline homopolypropylenes have the above mentioned properties.

In this connection, the fraction soluble in boiling p-xylene of the above-mentioned crystalline homopolypropylene can be determined by the following process. 5 g of a crystalline homopolypropylene is extracted by a boiling p-xylene with Soxhlet extraction, and a filtrated liquid is kept at 20° C. for one whole day and night. After that, acetone is added to the filtrated liquid to raise deposition, and the deposited substance is filtered and dried. The mass of the resultant dry substance (=W1 (g)) is measured, and the fraction soluble in boiling p-xylene (%) is calculated based on the following formula (I).

A fraction soluble in boiling p-xylene (%)=(W1/5)×100    (I)

<Preparation Method>

The polypropylene (A) of the present invention is produced by known polymerization methods. Any catalysts which can produce a crystalline homopolypropylene can be used. Among them, a polymerization method using a catalyst consisting of an electron donor having a number of ether bonds with a titanium catalyst moiety as disclosed in J.P. KOKAI Nos. 3-706, 8-170984 and 9-20803 (these documents are incorporated herein by reference) is preferred. The MFR of the polypropylene (A) of the present invention may be controlled by using known control methods. For example, the control methods include a control method in which a polymerizing condition such as an amount of molecular weight regulant such as hydrogen, polymerizing temperature and pressure during the polymerization is adjusted; and a control method in which an organic peroxide such as diacyl peroxide or dialkyl peroxide is added after the polymerization (J.P. KOKAI No. 8-302105 which is incorporated herein by reference). A method for controlling MFR used in the present invention is preferably the above-mentioned control method applied during the polymerization from the viewpoint of appearance of a molded article.

<Polypropylene (B)>

The polypropylene of the component (B) of the present invention consists of a crystalline homopolypropylene ($B^1$) and an ethylene-propylene copolymer rubber ($B^2$). Preferably, the polypropylene is prepared by two or more polymerization steps in a continuous multistage polymerization between the crystalline homopolypropylene ($B^1$) and the ethylene-propylene copolymer rubber ($B^2$), in which crystalline homopolypropylene ($B^1$) is prepared in a first polymerization step or one thereafter.

<Crystalline Homopolypropylene ($B^1$)>

The crystalline homopolypropylene ($B^1$) incorporated in the polypropylene (B) of the present invention is preferably isotactic. Although properties of the component($B^1$) are not particularly limited, it is preferred that, as is the case with the component (A), a fraction soluble in boiling p-xylene be suitably 6.0% by mass or less, preferably 3.0% by mass or less, from the viewpoint of enhancing the physical properties of said component such as stiffness and heat resistance temperature. The melt flow rate determined at 230° C. under 21.6 N load of the component ($B^1$) is preferably, for example, 1.0 to 1,000 g/10 min. When the MFR of the component ($B^1$) in the polypropylene (B) falls within this range, it is preferred that a high-impact property and flowability is kept in balance. A combination of two or more components ($B^1$) within this range can be used.

<Ethylene-Propylene Copolymer Rubber ($B^2$)>

The content of ethylene in the ethylene-propylene copolymer rubber ($B^2$) included in the polypropylene (B) of the present invention is 45 to 80% by mass, preferably 45 to 60% by mass, more preferably 50 to 60% by mass, based on the mass of the component ($B^2$). When the ethylene content is in the range of 45 to 60% by mass, a polyethylene linking moiety can be sufficiently present in the component ($B^2$), whereby a sufficient scratch resistance can be obtained (T. Nomura et al. J. Appl. Polym. Sci., 55, pages 1307–1315 (1995), which document is incorporated herein by reference).

In the ethylene-propylene copolymer rubber ($B^2$), an intrinsic viscosity [η] determined at 135° C. in decalin is suitably 4.0 to 7.0 dl/g, preferably 4.0 to 5.5 dl/g. When the intrinsic viscosity [η] is 4.0 dl/g or more, an orientation caused by having the component ($B^2$) flow at injection molding can be prevented, whereby a sufficient lowering gloss can be obtained. When the intrinsic viscosity [η] is also 4.0 dl/g or more, a sufficient elastic recovery strength can be obtained, whereby a good scratch resistance can also be obtained (T. Nomura et al. J. Appl. Polym. Sci., 55, pages 1307–1315 (1995)).

On the other hand, when the intrinsic viscosity [η] is 7.0 dl/g or less, the presence of gels on a surface of an article, which lowers the quality of the molded article, can be prevented. Also, a sufficient improvement in a high-impact property can be obtained. Therefore, interior parts of a car having the required properties can be achieved.

The polypropylene (B) suitably contains the ethylene-propylene copolymer rubber ($B^2$) in an amount of at least 10% by mass, preferably 10 to 60% by mass, more preferably 15 to 40% by mass, based on the total amount of the component (B). When the content of the ethylene-propylene copolymer rubber ($B^2$) is 10% by mass or more, a sufficient lowering of gloss and improving of scratch resistance can be obtained. When said content is 60% by mass or less, it is preferred that production errors, so-called faulting, which occurs when producing the component (B), be significantly prevented.

<Preparation Method>

The polypropylene (B) of the present invention can be prepared from the above-mentioned crystalline homopolypropylene ($B^1$) and the ethylene-propylene copolymer rubber ($B^2$) by, for example, polymerizing them with a method such as continuous multistage polymerization. The continuous multistage polymerization means a method for polymerizing one polymer in the presence of at least one other polymerizing component. For example, at first, the crystalline homopolypropylene ($B^1$) is polymerized in a first reactor, thereby removing non-reacted propylene monomers. The obtained crystalline homopolypropylene ($B^1$) is introduced into a second reactor, propylene monomer and ethylene monomer, which monomers are used for polymerizing the ethylene-propylene copolymer rubber ($B^2$), are also introduced therein, and thereafter the ethylene-propylene copolymer rubber ($B^2$) is polymerized. In this case, the reactor preferably has a device which can rapidly send a polymerized polymer to the next reactor. As for a polymerizing method, known polymerizing methods such as slurry polymerization and gas phase polymerization can be used. In the polymerization, a catalyst which provides an isotactic polypropylene, e.g. a Ziegler-Natta catalyst and a metallocene catalyst, can be used. In the polymerization, a molecular weight regulant such as hydrogen can be added. The polymerization can be carried out by adjusting a polymerizing condition such as temperature, pressure and concentration of monomers.

<Polypropylene (C)>

The polypropylene of the component (C) of the present invention, like the component (B), consists of a crystalline homopolypropylene ($C^1$) and an ethylene-propylene copolymer rubber ($C^2$). Preferably, the polypropylene is prepared by two or more polymerization steps in a continuous multistage polymerization between the crystalline homopolypropylene ($C^1$) and the ethylene-propylene copolymer rubber ($C^2$), in which the copolymer rubber ($C^2$) has a property different from that of the ethylene-propylene copolymer rubber ($B^2$) used in polypropylene (B).

<Crystalline Homopolypropylene ($C^1$)>

The crystalline homopolypropylene ($C^1$) incorporated in the polypropylene (C) of the present invention is preferably isotactic. Although properties of the component ($C^1$) are not particularly limited, it is preferred that, as is the case with the component (A), a fraction soluble in boiling p-xylene is suitably 6.0% by mass or less, preferably 3.0% by mass or less, from the viewpoint of enhancing physical properties such as stiffness and heat resistance temperature. The melt flow rate of the component ($C^1$) as determined at 230° C. under 21.6 N load is preferably, for example, 1.0 to 1,000 g/10 min. When the MFR of the component ($C^1$) in the polypropylene (C) falls within this range, it is preferred that a high-impact property and flowability be kept in balance. A combination of two or more components ($C^1$) can be used.

<Ethylene-Propylene Copolymer Rubber ($C^2$)>

The content of ethylene in the ethylene-propylene copolymer rubber ($C^2$) included in the polypropylene (C) of the present invention is from 25% by mass or more to below 45% by mass, preferably from 35% by mass or more to below 45% by mass, more preferably 35 to 40% by mass, based on the mass of the component ($C^2$). When the ethylene content is in the range of 25% by mass or more, sufficient effect of lowering a gloss can be obtained. When the ethylene content is in the range of below 45% by mass, the compatibility the component ($C^2$) with the component (A) of a crystalline homopolypropylene, the component ($B^1$) and the component ($C^1$) can be maintained in an appropriate condition, whereby, impact strength can be sufficiently improved.

In the ethylene-propylene copolymer rubber ($C^2$), an intrinsic viscosity [η] determined at 135° C. in decalin is suitably 5.0 to 10 dl/g, preferably 5.0 to 8.0 dl/g. When the intrinsic viscosity [η] of the component ($C^2$) is 5.0 dl/g or more, a die-swell ratio at a shear rate of $\gamma=200$ s$^{-1}$ during a determination by using a capillary rheometer at 210° C. (using L/D=40 capillary, wherein L is a length of an orifice to be used, and D is a diameter of the capillary) can be maintained in the range of 1.15 or more. When the die-swell is larger, a degree of adhesion between a molded article and a mold during preparing a molded product is also larger. Therefore, a gas generated during injection molding is shoved ahead of the molded article along the stream without being generated between the molded article and the mold, and thereby exhausting of the gas is enhanced. Accordingly, the appearance of a weldline and a silver streak on a surface of a molded article can be prevented. Further, since adhesion to a mold is improved, embossed pattern transferability is also improved, and thus appearance of a flow mark can be inhibited. Also, the good appearance of a molded article can be maintained. When the intrinsic viscosity [η] is 10 dl/g or less, the presence of gels on a surface of an article, which lowers the quality of the molded article, can be prevented. Also, a high-impact property can be sufficiently improved. Therefore, interior parts of a car having the required properties can be achieved.

The polypropylene (C) used in the present invention suitably contains the ethylene-propylene copolymer rubber ($C^2$) in an amount of at least 10% by mass, preferably 10 to 60% by mass, more preferably 15 to 40% by mass, based on the total amount of the component (C). When the content of the ethylene-propylene copolymer rubber ($C^2$) is 10% by mass or more, a sufficient high-impact property can be obtained. Therefore, for example, it is not necessary to externally add a large amount of elastomer (G), which will be described below. When said content is 60% by mass or less, it is preferred that production errors, so-called faulting caused by increasing a sticky component during producing the component (C) be significantly prevented.

<Preparation Method>

The polypropylene (C) of the present invention is not particularly limited so far as the polypropylene (C) produced meets the above-mentioned conditions. The polypropylene (C) of the present invention can be produced by the same method as the method for producing the polypropylene (B). That is, instead of the component ($B^1$), the crystalline homopolypropylene ($C^1$) is polymerized in the first reactor. Thereafter, the ethylene-propylene copolymer rubber (B2) which has a structure different from that of the component ($B^2$) is polymerized in the second reactor in the polymerizing condition which is different from that used in the preparation of ($B^2$). In the polymerization, a catalyst which provides an isotactic polypropylene, e.g. a Ziegler-Natta catalyst and a metallocene catalyst, can be used. In the polymerization, a molecular weight regulant such as hydrogen can be added. The polymerization can be carried out by adjusting a polymerizing condition such as temperature and monomer concentration.

<Ethylene-α-Olefin Copolymer Rubber (D)>

The ethylene-α-olefin copolymer rubber (D) used in the present invention is a rubber which is obtained by copolymerizing ethylene with α-olefin. The α-olefin used in the ethylene-α-olefin copolymer rubber (D) includes, for example, propylene, 1-butene, 1-pentene, 1-hexene, 1-heptene, 1-octene, 4-methyl-1-pentene, 4-methyl-1-hexene, ethylidene norbornene, 1,4-hexadiene, 1,9-decadiene and vinyl norbornene. Either one of these α-olefin or a combination of two or more of them may be used. Inclusion of propylene, 1-butene, 1-hexene and 1-octene is preferred in these α-olefins. Therefore, the ethylene-α-olefin copolymer rubber (D) used in the present invention preferably includes, for example, an ethylene-propylene copolymer rubber, an ethylene-butene copolymer rubber, an ethylene-hexene copolymer rubber and an ethylene-octene copolymer rubber.

The above-mentioned ethylene-α-olefin copolymer rubber (D) suitably contains ethylene in the range from 50% by mass to 80% by mass, preferably from 55% by mass to 70% by mass. When the ethylene content is 50% by mass or more (50% by mass or less of α-olefin) as well as 80% by mass or less, it is preferred that adhesion during the production can be inhibited, that production errors be prevented and that sufficiently high-impact property be obtained.

The melt flow rate (MFR) of the above-mentioned ethylene-α-olefin copolymer rubber (D) as determined at 230° C. and 21.6 N load. (JIS K7210) is suitably 0.1 to 1.0 g/10 min., preferably 0.1 to 0.6 g/10 min. When the MFR is 0.1 g/10 min. or more, it is preferred that sufficiently high-impact property be obtained. When the MFR is 1.0 g/10 min. or less, it is preferred that a sufficiently lower gloss be obtained.

A comonomer sequencing distribution (CSD) determined by $^{13}$C-NMR is suitably 1.0 to 2.0, preferably 1.1 to 1.7. When the CSD is 1.0 or more, it is preferred that alternating of a composition of the copolymer rubber (D) not be increased. When the CSD is 2.0 or less, it is preferred that blocking ability not be increased. When the CSD is in the range of 1.0 to 2.0, compatibility of the copolymer rubber (D) with the component (A) of a crystalline homopolypropylene, the component ($B^1$) and the component ($C^1$) can be maintained, therefore, impact strength be sufficiently improved.

In this connection, the CSD is a parameter which indicates randomness of a composition of the copolymer. Specifically, if the composition of the ethylene-α-olefin copolymer is a complete alternating copolymer, then the CSD is 0, if it is a complete block copolymer, then the CSD is infinite, and if it is a random copolymer, then the CSD is 1.0. The CSD is calculated by multiplying ethylene content determined from dyad linkage in $^{13}$C-NMR (molar fraction; $P_E$) with α-olefin content (molar fraction; $P_\alpha$), doubling it, and dividing it by a molar fraction of the ethylene-α-olefin alternating linkage ($P_{E\alpha}$) squared, i.e. calculated by the following formula (II).

$$CSD=((2P_E \cdot P_\alpha)/(P_{E\alpha})^2) \qquad (II)$$

Wherein, $P_E$, $P_\alpha$ and $P_{E\alpha}$ are determined by the following procedures. Specifically, in a 10 mm φ test tube, 200 mg of the ethylene-α-olefin copolymer rubber is homogeneously dissolved in 2 ml of a mixed solvent including 1,2,4-trichlorobenzene and deuterated benzene (in a volume ratio of 9:1) to determine its $^{13}$C-NMR spectra under the condition as shown below.

Device: JNM-EX270 (made by JOEL Ltd.)
Measurement temp.: 120° C.
Measurement frequency: 100.50 MHz
Pulse separation: 3.8 sec.
Integrating times: 5,000 times $P_E$, $P_\alpha$ and $P_{E\alpha}$ can be determined by the above-mentioned $^{13}$C-NMR spectra on the basis of the reports of G. J.Ray et al, Macromolecules, 10, 773 (1977), J. C. Randall et al, Macromolecules, 15, 353 (1982), J. Polym. Sci., Polym. Phy. Ed., 11, 275 (1973), and K. Kimura et al, Polymer, 25, 441 (1984), which documents are incorporated herein by reference.

<Preparation Method>

The ethylene-α-olefin copolymer rubber (D) of the present invention can be prepared using a known polymerization method such as a method of radical polymerization, anion polymerization or cation polymerization. A catalyst used for the polymerization may include a titanium catalyst, a vanadium catalyst and a metallocene catalyst.

<Inorganic Filler (E)>

As for an inorganic filler used in the present invention, known inorganic materials can be used. Specifically, the inorganic materials include, for example, a natural silicic acid or silicate such as talc, kaolinite, baked clay, pyrophyllite, sericite, and wollastonite; a carbonate such as sedimentary calcium carbonate, heavy calcium carbonate and magnesium carbonate; a hydroxide such as aluminum hydroxide and magnesium hydroxide; an oxide such as zinc oxide, flower of zinc and magnesium oxide; a powdery filler of synthetic silicic acid or silicate and the like such as hydrated calcium silicate, hydrated aluminum silicate, hydrated silicic acid and silicic acid anhydride; a flake-form filler such as mica; a fabric-form filler such as basic magnesium sulfate whisker, calcium titanate whisker, aluminum borate whisker, sepiolite, PMF(Processed Mineral Filler), xonotlite, potassium titanate; and a balloon-formed filler such as glass balloon and fly ash balloon. One of these inorganic fillers or a combination of two or more of them may be used. In this invention, talc is preferably used from among the above inorganics.

An average particle size of the inorganic filler used in the present invention is suitably, for example, 0.10 to 4.0 μm, preferably 0.20 to 3.0 μm. The average particle size means a particle size having 50% of a cumulative value of a particle size distribution measurement profile determined by a liquid phase sedimentation method based on JIS Z8820. When the average particle size is 0. 10 μm or more, it is preferred that a lowering of the mechanical properties caused by secondary aggregation during kneading not occur. When the average particle size is 4.0 μm or less, it is preferred that the mechanical property, especially a high-impact property, not be reduced.

The inorganic filler used in the present invention suitably has a particle having an average particle size of 5.0 μm or more in an amount of 10% by mass or less, preferably in an amount of 8.0% by mass or less. When a content of the particle having an average particle size of 5.0 μm or more is 10% by mass or less, it is preferred that lowering of a mechanical properties, especially a high-impact property caused by increasing an amount of bulky particles not occur.

An average of an aspect ratio of the inorganic filler used in the present invention is suitably, for example, 3.0 or more, preferably 4.0 or more from the viewpoint of enhancing mechanical properties.

The inorganic filler used in the present invention may be untreated or treated beforehand on its surface. Examples of this surface treatment include a chemical or physical method by using surface treatment agents such as a silane coupling agent, higher fatty acid, fatty acid metal salt, unsaturated organic acid, organic titanate, or polyethylene glycol.

<Lubricant (F)>

The lubricants used in the present invention include, for example, aliphatic hydrocarbons such as paraffin wax, polyethylene wax and polypropylene wax; caprolyic acids and their derivatives; higher fatty acids such as lauric acid, myristic acid, palmitic acid, marganic acid, stearic acid, arachidic acid and behenic acid, and its metal salts (such as lithium salt, calcium salt, sodium salt, magnesium salt and potassium salt); aliphatic alcohols such as palmityl alcohol, cetyl alcohol and stearyl alcohol; fatty acid amides such as caprolic amide, caprylic acid amide, capric acid amide, lauric acid amide, myristic acid amide, palmitic acid amide, oleic acid amide and stearic acid amide; esters between an aliphatic series and an alcohol; and fluorinated compounds such as fluoroalkylcarboxylic acid and its metal salt as well as fluoroalkylsulfonic acid metal salt. Among the above, stearic acid amide and oleic acid amide are preferably used.

<Elastomer (G)>

The propylene resin composition of the present invention may contain another elastomer which differs from the components (A) to (D) so far as the aim of the present invention is not impaired. Such another elastomer includes, for example, olefin elastomer and styrene thermoplastic elastomer.

The olefin elastomer includes, for example, an amorphous elastic copolymer which includes an olefin as a main component. Specifically, the olefin elastomer includes an α-olefin copolymer elastomer such as ethylene-propylene, 1-butene, 1-pentene, 1-hexene and 1-octene, and a copolymer elastomer between the above components and a disconjugate diene.

The disconjugate diene includes dicyclopentadiene, 1,4-hexadiene, dichlorooctadiene, methylene norbornene, and 5-ethylidene-2-norbornene.

This olefin elastomer specifically includes ethylene-propylene copolymer elastomer, ethylene.1-butene copolymer elastomer, ethylene-propylene.1-butene copolymer elastomer, ethylene-propylene.disconjugate diene copolymer elastomer, ethylene.1-butene disconjugate diene copolymer elastomer, and ethylene-propylene.1-butene disconjugate diene copolymer elastomer.

The styrene thermoplastic elastomer includes a block copolymer between styrenes and a conjugate diene compound. The styrenes include alkylstyrene such as styrene, α-methylstyrene, p-methylstyrene and p-t-buthylstyrene; p-methoxystyrene; vinylnaphthalene; and a combination thereof. Among the above, styrene is preferred.

The conjugate diene compound includes butadiene, isoprene, piperylene, methylpentadiene, phenylbutadiene, 3,4-dimethyl-1,3-hexadiene, 4,5-diethyl-1,3-octadiene, and a combination thereof. Among the above, butadiene and isoprene are preferred.

The styrene thermoplastic elastomer specifically includes styrene.butadiene diblock copolymer, styrene.butadiene.styrene triblock copolymer, styrene.isoprene diblock copolymer, styrene.isoprene.styrene triblock copolymer, hydrogenated styrene.butadiene diblock copolymer, hydrogenated styrene.butadiene.styrene triblock copolymer, hydrogenated styrene.isoprene diblock copolymer, and hydrogenated styrene.isoprene.styrene triblock copolymer.

The styrene thermoplastic elastomer having the mass ratio between the unit derived from styrene compound and the unit derived from a conjugate diene compound of 10:90 to 65:35, preferably 20:80 to 50:50 is suitably used for the present invention.

In this connection, the molecular structure of this styrene thermoplastic elastomer may be straight, branched, radial or the combination thereof.

<Other Polymer Components (H)>

The propylene resin composition of the present invention may contain another polymer which differs from the components (A) to (D) and (G) so far as the aim of the present invention is not impaired.

Said other polymer specifically includes an olefin homopolymer such as polyethylene, polypropylene, poly 1-butene; or denatured olefin polymer such as α-olefin copolymer, copolymer of α-olefin with vinyl monomer, maleic anhydride denatured polypropylene; nylon; polycarbonate; ABS; polystyrene; poly vinyl chloride; polyphenylene oxide; petroleum resin and phenol resin. Among them, a homopolypropylene in the range of MFR which is different from that of the component (A) of the present invention is most preferred.

<The Content of the Components (A) to (H)>

The present invention contains the components (A) to (D) and the optional components (E) to (H) in the following content. In this connection, unless otherwise stated, % by mass as described below represents a ratio based on the total mass of the components other than the components represented by a unit of a part by mass, i.e. the components (A) to (H) other than the component (F). Furthermore, a unit of a part by mass as described below is based on the total mass of the components (E) to (H), other than the component (F) if any, as 100 parts by mass. The components whose content is represented by % by mass are contained in an amount in which the total content of all the components represented by % is 100% by mass or less, preferably 100% by mass. That is, all the components (A) to (H) other than the component (F) are contained in an amount of 100% by mass or less based on the total content of all the components (A) to (H) other than the component (F).

The content of the propylene (A) is suitably 5.0 to 30% by mass, preferably 10 to 20% by mass. When this content is 5.0% by mass or more, it is preferred that sufficient flowability be obtained and defective molding such as a short shot, flow mark and weld line not appear when interior parts of a car is being produced. When this content is 30% by mass or less, it is preferred that impact strength not be reduced.

The content of the propylene (B) is suitably 10 to 50% by mass, preferably 15 to 40% by mass. When this content is 10% by mass or more, it is preferred that a sufficient amount of the ethylene-propylene copolymer rubber ($B^2$) be present in the polypropylene resin composition of the present invention, thereby sufficiently lowering gloss and improving scratch resistance. When this content is 50% by mass or less, it is preferred that a high-impact property not be reduced.

The content of the propylene (C) is suitably 5.0 to 30% by mass, preferably 5.0 to 20% by mass. When this content is 5.0% by mass or more, it is preferred that a sufficient amount of the ethylene-propylene copolymer rubber ($C^2$) be present in the polypropylene resin composition of the present invention, whereby, a sufficient high-impact property can be obtained without adding a large amount of the component (G) which leads to a cost increase. When this content is 30% by mass or less, it is preferred that lower gloss not be adversely affected.

The content of the ethylene-α-olefin copolymer rubber (D) is suitably 5.0 to 40% by mass, preferably 10 to 30% by mass. When this content is 5.0% by mass or more, it is preferred that gloss be sufficiently lowered. When this content is 40% by mass or less, it is preferred that a high-impact property be sufficiently enhanced and that a cost not be increased.

The content of the inorganic filler (E) is suitably 10 to 30% by mass, preferably 15 to 25% by mass. When this content is 10% by mass or more, it is preferred that stiffness required for interior parts of a car not be reduced. When this content is 30% by mass or less, it is preferred that a high-impact property not be reduced.

The content of the lubricant (F) is suitably 0.01 to 2.0 parts by mass, preferably 0.1 to 0.5 parts by weight. When this content is 0.01 part by weight or more, it is preferred that the effects derived from the lubricant be significantly expressed, and that scratch resistance not be reduced. When this content is 2.0 parts by mass or less, it is preferred that heat resistance and stiffness not be reduced.

The content of the elastomer (G) is suitably 10% by mass or less, preferably 1.0 to 5.0% by mass. When this content is 10% by mass or less, it is preferred that an increase in cost be prevented, and that sufficient impact strength for interior parts of a car be maintained.

The content of the other polymer component (H) is suitably 40% by mass or less, preferably 30% by mass or less. When this content is 40% by mass or less, it is preferred that amounts of the essential components (A) to (D) sufficient for enabling the present invention to have the above mentioned properties be contained.

<Other Components (I)>

In addition to the above-mentioned components (A) to (H), the polypropylene resin composition of the present invention further contains a nucleating agent, an antioxidant, an hydrochloric acid absorbent, a light stabilizer, a heat resistance stabilizer, an TV absorbent, an antistatic agent, a fire retardant, a pigment, a colorant, a dispersant, a cuprous damage inhibitor, a corrector, a plasticizer, a blowing agent, a bubble inhibitor, a cross-linker, and additives such as peroxide as other components (I), so far as the aim of the present invention is not impaired.

<A Nucleating Agent>

Various known nucleating agents can be used for the nucleating agent without any specific limitation. Among them, a nucleating agent such as an aromatic phosphate salt and a dibenzylidene sorbitol is preferred. By adding the nucleating agent, a crystallizing rate for the propylene polymer composition of the present invention is increased, and a crystallized particle can be found during the crystallization as well as formed at a higher speed.

The aromatic phosphate salt specifically includes, for example, sodium-2,2'-methylene-bis(4,6-di-t-butylphenyl)phosphate, sodium-2,2'-ethylidene-bis(4,6-di-t-butylphenyl)phosphate, lithium-2,2'-methylene-bis-(4,6-di-t-butylphenyl)phosphate, lithium-2,2'-ethylidene-bis(4,6-di-t-butylphenyl)phosphate, sodium-2,2'-ethylidene-bis(4-i-propyl-6-t-butylphenyl)phosphate, lithium-2,2'-methylene-bis(4-methyl-6-t-butylphenyl)phosphate, lithium-2,2'-methylene-bis(4-ethyl-6-t-butylphenyl)phosphate, calcium-bis[2,2'-thiobis(4-methyl-6-t-butylphenyl)phosphate], calcium-bis[2,2'-thiobis(4-ethyl-6-t-butylphenyl)phosphate], calcium-bis[2,2'-thiobis(4,6-di-t-butylphenyl)phosphate], magnesium-bis[2,2'-thiobis(4,6-di-t-butylphenyl)phosphate], magnesium-bis[2,2'-thiobis-(4-t-octylphenyl)phosphate], sodium-2,2'-butylidene-bis(4,6-di-methylphenyl)phosphate, sodium-2,2'-butylidene-bis(4,6-di-t-butylphenyl)phosphate, sodium-2,2'-t-octylmethylene-bis(4,6-dimethylphenyl)phosphate, sodium-2,2'-t-octylmethylene-bis(4,6-di-t-butylphenyl)phosphate, calcium-bis-(2,2'-methylene-bis(4,6-di-t-butylphenyl)phosphate), magnesium-bis[2,2'-methylene-bis(4,6-di-t-butylphenyl)phosphate], barium-bis[2,2'-methylene-bis(4,6-di-t-butylphenyl)phosphate], sodium-2,2'-methylene-bis(4-methyl-6-t-butylphenyl)phosphate, sodium-2,2'-methylene-bis(4-ethyl-6-t-butylphenyl)phosphate, sodium-(4,4'-dimethyl-5,6'-di-t-buthyl-2,2'-biphenyl)phosphate, calcium-bis[(4,4'-dimethyl-6,6'-di-t-butyl-2,2'-biphenyl)phosphate], sodium-2,2'-ethylidene-bis(4-m-butyl-6-t-butylphenyl)phosphate, sodium-2,2'-methylene-bis(4,6-di-methylphenyl)phosphate, sodium-2,2'-methylene-bis(4,6-di-ethylphenyl)phosphate, potassium-2,2'-ethylidene-bis(4,6-di-t-butylphenyl)phosphate, calcium-bis[2,2'-ethylidene-bis(4,6-di-t-butylphenyl)phosphate], magnesium-bis[2,2'-ethylidene-bis(4,6-di-t-butylphenyl)phosphate], barium-bis[2,2'-ethylidene-bis(4,6-di-t-butylphenyl)phosphate], aluminum-tris[2,2'-methylene-bis(4,6-di-t-butylphenyl)phosphate], aluminum-tris[2,2'-ethylidene-bis(4,6-di-t-butylphenyl)phosphate], sodium-bis(4-t-butylphenyl)phosphate, sodium-bis(4-methylphenyl)phosphate, sodium-bis(4-ethylphenyl)phosphate, sodium-bis(4-i-propylphenyl)phosphate, sodium-bis(4-t-octylphenyl)phosphate, potassium-bis(4-t-butylphenyl)phosphate, calcium-bis(4-t-butylphenyl)phosphate, magnesium-bis(4-t-butylphenyl)phosphate, lithium-bis(4-t-butylphenyl)phosphate, aluminum-bis(4-t-butylphenyl)phosphate, and a combination thereof. Among them, sodium-2,2'-methylene-bis(4,6-di-t-butylphenyl)phosphate is preferred.

The sorbitol nucleating agent specifically includes, for example, 1,3,2,4-dibenzylidene sorbitol, 1,3-benzylidene-2,4-p-methylbenzylidene sorbitol, 1,3-benzylidene-2,4-p-ethylbenzylidene sorbitol, 1,3-p-methylbenzylidene-2,4-benzylidene sorbitol, 1,3-p-ethylbenzylidene-2,4-benzylidene sorbitol, 1,3-p-methylbenzylidene-2,4-p-ethylbenzylidene sorbitol, 1,3-p-ethylbenzylidene-2,4-p-methylbenzylidene sorbitol, 1,3,2,4di(p-methylbenzylidene) sorbitol, 1,3,2,4-di(p-ethylbenzylidene)sorbitol, 1,3,2,4-di(p-n-propylbenzylidene)sorbitol, 1,3,2,4-di(p-i-propylbenzylidene)sorbitol, 1,3,2,4-di(p-n-butylbenzylidene)sorbitol, 1,3,2,4di(p-s-butylbenzylidene) sorbitol, 1,3,2,4-di(p-t-butylbenzylidene)sorbitol, 1,3,2,4-di (2',4'-dimethylbenzylidene)sorbitol, 1,3,2,4-di(p-methoxybenzylidene)sorbitol, 1,3,2,4-di(p-ethoxybenzylidene)sorbitol, 1,3benzylidene-2-4-p-chlorbenzylidene sorbitol, 1,3-p-chlorbenzylidene-2,4-benzylidene sorbitol, 1,3-p-chlorbenzylidene-2,4-p-methylbenzylidene sorbitol, 1,3-p-chlorbenzylidene-2,4-p-ethylbenzylidene sorbitol, 1,3-p-methylbenzylidene-2,4-p-chlorbenzylidene sorbitol, 1,3-p-ethylbenzylidene-2,4-p-chlorbenzylidene sorbitol, 1,3,2,4-di(p-chlorbenzylidene) sorbitol, and a combination thereof.

Among them, 1,2,3,4-dibenzilidene sorbitol, 1,2,3,4-di(p-methylbenzilidene)sorbitol, 1,2,3,4-di(p-ethylbenzilidene) sorbitol, 1,3-chlorbenzilidene-2,4-p-methylbenzilidene sorbitol, 1,2,3,4-di(p-chlorbenzilidene)sorbitol, and a combination thereof are preferred.

The nucleating agent also includes a metal salt of an aromatic carboxylic acid and a metal salt of an aliphatic carboxylic acid. Specifically, aluminum benzoate, aluminum p-tert-butyl benzoate, sodium adipate, sodium thiophenecarbonate and sodium pyrrolecarbonate can be included. An inorganic compound such as talc can be used for the nucleating agent.

<Antioxidant>

The antioxidant may include, for example, a phenolic antioxidant, a sulfuric antioxidant and a phosphoric antioxidant. The phenolic antioxidant may include a polyphenol oligo carbonate, for example, phenols such as 2,6-di-tert-butyl-p-cresol, stearyl(3,3-dimethyl-4-hydroxybenzyl) thioglycolate, stearyl-β-(4-hydroxy-3,5-di-tert-butylphenol) propionate, distearyl-3,5-di-tert-butyl-4-hydroxybenzyl phosphonate, 2,4,6-tris(3',5'-di-tert-butyl-4'-hydroxybenzylthio)-1,3,5-triazine, distearyl(4-hydroxy-3-methyl-5-tert-butylbenzyl)malonate, 2,2-'methylenebis(4-methyl-6-tert-butylphenol), 4,4'-methylenebis(2,6-di-tert-buthylphenol), 2,2'-methylenebis[6-(1-methylcyclohexyl)p-cresol], bis[3,5-bis[4-hydroxy-3-tert-butylphenyl)butylic acid]glycol ester, 4,4'-butylidenebis(6-tert-butyl-m-cresol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl]terephthalate, 1,3,5-tris(2,6-dimethyl-3-hydroxy-4-tert-butyl)benzyl isocyanurate, 1,3,5-tris(3,5-di-tert-butyl-4-hydroxybenzyl)-2,4,6-trimethylbenzene, tetrakis[methylene-3-(3,5-di-tert-butyl-4-hydroxyphenyl) propionate]methane, 1,3,5-tris(3,5-di-tert-butyl-4-hydroxybenzyl)isocyanurate, 1,3,5-tris[(3,5-di-tert-butyl-4-hydroxyphenyl)propionyloxyethyl]isocyanurate, 2-octylthio-4,6-di(4-hydroxy-3,5-di-tert-butyl)phenoxy-1,3, 5-triazine and 4,4'-thiobis(6-tert-butyl-m-cresol); and an oligo carbonate such as 4,4'-butylidenebis(2-tert-butyl-5-methylphenol) (e.g. having polymerization degree of 2 to 10).

The sulfuric antioxidant may include, for example, dialkyl-tiodipropionate such as dilauryl-, dimyristyl- and distearyl-tiodipropionate, and a polyol (e.g. glycerin, trimethylolethane, trimethylolpropane, pentaerythritol and trishidroxyethyl isocyanurate) of alkyl-tiopropionate such as butyl-, octyl-, lauryl- and stearyl-tiopropionate (e.g. pentaerythritol tetralauryltiopropionate).

The phosphoric antioxidant may include, for example, trioctylphosphite, trilaurylphosphite, tridecylphosphite, octyl-diphenylphosphite, tris(2,4-di-tert-butylphenyl) phosphite, triphenylphosphite, tris(butoxyethyl)phosphite, tris(nonylphenyl)phosphite, distearylpentaerythritoldiphosphite, tetra(tridecyl)-1,1,3-tris (2-methyl-5-tert-butyl-4-hydroxyphenyl)butanediphosphite tetra($C_{12}$~$C_{15}$mixed alkyl)-4,4'-isopropylidenediphenyldiphosphite, tetra(tridecyl)-4,4'-butylidenebis(3-methyl-6-tert-butylphenol)diphosphite, tris(3,5-di-tert-butyl-4hydroxyphenyl)phosphite, tris(mono-di-mixed nonylphenyl)phosphite, hydrogenated-4,4'-isopropylidenediphenylpolyphosphite, bis(octylphenyl).bis [4,4'-butylidenebis(3-methyl-6-tert-butylphenol)].1,6-hexanedioldiphosphite, phenyl.4,4'-isopropylidenediphenyl.pentaerythritoldiphosphite, bis(2,4-di-tert-butylphenyl)pentaerythritoldiphosphite, bis(2,6-di-tert-butyl-4methylphenyl)pentaerythritoldiphosphite, tris[4,4'-isopropylidenebis(2-tert-butylphenol)]phosphite, phenyl.diisodecylphosphite, di(nonylphenyl) pentaerythritoldiphosphite), tris(1,3-di-stearoyloxyisopropyl)phosphite, 4,4'-isopropylidenebis(2-tert-butylphenol).di(nonylphenyl)phosphite, 9,10-dihydro-9-oxa-9-oxa-10-phosphaphenanthrene-10-oxide, tetrakis(2,4-di-tert-butylphenyl)-4,4'-biphenylenediphosphonite.

The other antioxidant may include, for example, 6-hydroxychroman derivative such as various α,β, γ or δ tocopherol or a mixture thereof; 2,5-dimethyl, 2,5,8-trimethyl or 2,5,7,8-tetramethyl substituted compounds of 2-(4-methyl-penta-3-enyl)-6-hydroxychroman; 2,2,7-trimethyl-5-tert-butyl-6-hydroxychroman; 2,2,5-trimethyl-7-tert-butyl-6-hydroxychroman; 2,2,5-trimethyl-6-tert-butyl-6-hydroxychroman; and 2,2-dimethyl-5-tert-butyl-6-hydroxychroman.

<Hydrochloric Acid Absorbent>

The hydrochloric acid absorbent may include, for example, a double compound as shown in the following formula;

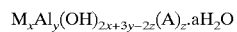

$M_xAl_y(OH)_{2x+3y-2z}(A)_z.aH_2O$ (wherein, M is Mg, Ca or Zn; A is an anion other than hydroxyl; x, y and z are positive numbers, a is 0 or a positive number)

Specifically, $Mg_6Al_2(OH)_{16}CO_3.4H_2O$, $Mg_6Al_2(OH)_{20}CO_3.5H_2O$, $Mg_5Al_2(OH)_{14}CO_3.4H_2O$, $Mg_{10}Al_2(OH)_{22}(CO_3)_2.4H_2O$, $Mg_6Al_2(OH)_{16}HPO_4.4H_2O$, $Ca_6Al_2(OH)_{16}CO_3.4H_2O$, $Zn_6Al_2(OH)_{16}CO_3.4H_2O$, $Zn_6Al_2(OH)_{16}SO_4.4H_2O$, $Mg_6Al_2(OH)_{16}SO_3.4H_2O$, and $Mg_6Al_2(OH)_{12}CO_3.3H_2O$ can be used for the hydrochloric acid absorbent.

<Light Stabilizer>

The light stabilizer may include, for example, hydroxy benzophenones such as 2-hydroxy-4-methoxybenzophenone, 2-hydroxy-4-n-octoxybenzophenone-2,2'-dihydroxy-4-methoxybenzophene, 2,4dihydroxybenzophenone; benzotryazoles such as 2-(2'-hydroxy-3'-tert-butyl-5'-methylphenyl)-5-chlorobenzotriazole, 2-(2'-hydroxy-3',5'-di-tert-butylphenyl)-5-chlorobenzotriazole, 2-(2'-hydroxy-5'-methylphenyl)benzotriazole, 2-(2'-hydroxy-3',5'-di-tert-amylphenyl)benzotriazole; benzoates such as phenylsalicylate, p-tert-butylphenylsalicylate, 2,4-di-tert-butylphenyl-3,5-di-tert-butyl-4-hydroxybenzoate, hexadecyl-3,5-di-tert-butyl-4-hydroxybenzoate; nickel compounds such as 2,2'-thiobis(4-tert-octylphenol)Ni salt, [2,2'-thiobis(4-tert-octylphenolate)]-n-butylamine Ni, (3,5-di-tert-butyl-4-hydroxybenzyl)phosphonic mono-ethyl ether Ni salt; substituted acrylonitriles such as α-cyano-β-methyl-β-(p-methoxyphenyl)methyl acrylate; oxalic acid diamides such as N'-2-ethylphenyl-N-ethoxy-5-tert-butylphenyl oxalic acid diamide, N-2-ethylphenyl-N'-2-ethoxyphenyl oxalic acid diamide; and hindered amine compounds such as bis(2,2,6,6-tetramethyl-4-piperidine)sebacate, poly[{(6-(1, 1,3,3-tetramethylbutyl)imino}-1,3,5-triazine-2,4-diyl{4-(2, 2,6,6-tetramethylpiperidyl)imino}hexamethylene], a condensate of 2-(4-hydroxy-2,2,6,6-tetramethyl-1-piperidyl) ethanol with dimethyl succinate, tetrakis(1,2,2,6,6-pentamethyl-4-piperidyl)-1,2,3,4-butanetetracarboxylate.

The other component (I) can be used in the range of 0.0001 to 10 parts by mass based on 100 parts by mass of the propylene resin composition of the present invention. Especially, the nucleating agent can be included in an amount of 0.001 to 10 parts by mass, preferably 0.01 to 5 parts by mass, more preferably 0.1 to 3 parts by mass based on 100 parts by mass of the propylene resin composition. By having such other component (I) contained therein, the propylene resin composition of the present invention can form a molded article which is improved in a balance of physical properties, durability, paintwork, printability, scratch resistance and molding workability.

(2) Method for Preparing the Polypropylene Resin Composition

The polypropylene resin composition used in the present invention is prepared by homogeneously formulating (or mixing) the components (A) to (D) and if necessary, the components (E) to (I). This formulating (or mixing) method is not particularly limited. Any method generally used in the field of synthetic resin can be used. The formulating (or mixing) method can include, for example, a general dry-blending method using a mixer such as Henschel mixer, a tumbler and a ribbon mixer, and a melt mixing method using a mixer such as an open roll, a twin screw intermeshing extruder, a kneader and Banbury. Such melt mixing method is carried out at a temperature where a resin to be used can melt. Preferably, the method is carried out at a temperature where a resin does not pyrolytically decompose or deteriorate, generally 160 to 350° C., preferably 170 to 260° C. In order to obtain a more homogeneous resin composition, two or more methods as stated above can be used together. The components may be dryblended beforehand, after which the obtained mixture may be melt mixed. Furthermore, in order to prepare a molded article by the molding method as will be explained below, the obtained mixture may be molded into a pellet by a pelletizer.

(3) Method for Preparing Interior Parts of a Car

The polypropylene resin composition used in the present invention can be molded by known methods for injection molding, for example, injection compression molding and gas injection molding, to form interior parts of a car having superior lower gloss and scratch resistance. In this connection, the injection molding is suitably carried out at a temperature where a resin to be used can melt, e.g. 160 to 350° C., preferably 170 to 260° C.

The following Examples and Comparative Examples will further illustrate the present invention, but such Examples by no means limit the invention.

EXAMPLE

[1] Preparation and Properties of the Components (A) to (C)

[A] Preparation of the Propylene (A)

(1) Preparation of a Catalyst

A method for preparing a catalyst used for preparing the propylene (A) is as follows. The following catalyst was prepared according to the method disclosed in J.P. KOKAI No. 9-020803, which document is incorporated herein by reference.

(1-1) Syntheses of Microspheroidal $MgCl_2.2.1\ C_2H_5OH$ 48 g of anhydrous $MgCl_2$, 77 g of anhydrous $C_2H_5OH$, and 830 ml of kerosene were fed, in inert gas and at ambient temperature, in a 2 liter autoclave equipped with a turbine agitator and drawing pipe. The content was heated to 120° C. while stirring, and thus the adduct formed between $MgCl_2$ and the alcohol melted and mixed with a dispersing agent. The nitrogen pressure inside the autoclave was maintained at 15 atoms. The drawing pipe of the autoclave was heated externally to 120° C. with a heating jacket. The drawing pipe had an inside diameter of 1 mm, and was 3 meters long from one end of the heating jacket to the other. Then the obtained mixture was caused to flow through the drawing pipe at a speed of 7 mr/sec. A 5 liter flask, which contained 2.5 l of kerosene and was externally cooled by way of a jacket maintained at an initial temperature of −40° C., was set. The mixture was poured in this flask under agitation, thereby a dispersion of the mixture was gathered. The final temperature of the dispersion was 0° C. The spherical solid product that constituted the dispersed phase of the emulsion was sedimented, filtrated and separated, and then washed with heptane and dried. All these operations were carried out in an inert gas atmosphere. 130 g of $MgCl_2.3C_2H_5OH$ in the form of spherical solid particles with a maximum diameter 50 μm or less were obtained. The ethanol was removed from the product thus obtained at temperatures that gradually increase from 50 to 100° C. in a nitrogen current, until the ethanol content was reduced to 2.1 moles per 1 mole of $MgCl_2$.

(1-2) Synthesis of 9,9-bis(hydroxymethyl)fluorene

In an anhydrous atmosphere, 100 ml of dimethyl sulfoxide (DMSO) distilled on $CaH_2$, 8 g of paraformaldehyde (rendered anhydrous at ambient temperature and at a pressure of 266 Pa (2 Torr) for 8 hours), and 1.4 g of sodium ethylate dissolved in 6 ml of ethanol were introduced in a 500 ml flask in this order. The resultant mixture was suspended, and the resultant suspension was cooled in a ice bath (the melt temperature of the DMSO/EtOH mixture was 13° C.). After that, while the suspension was allowed under agitation, 100 ml of a solution of 16 g of fluorene in DMSO were added, in a period of 30 seconds. After 3 minutes from the beginning of the addition of a solution of fluorene in DMSO, the reaction was stopped by adding 1.5 ml of HCl at 37%, and then the resultant was diluted with 400 ml of water. NaCl was added to the obtained mixture, and the mixture was saturated with NaCl. Ethyl acetate was added to form an organic phase and 9,9-bis(hydroxymethyl)fluorene was extracted with the ethyl acetate. Subsequently, the organic phase which was separated from water phase was dehydrated with anhydrous $Na_2SO_4$, then the organic phase was distilled off. Toluene was added to the obtained organic phase to crystallize 9,9-bishydroxymethyl)fluorene, and thereafter 15.2 g of 9,9-bis(hydroxymethyl)fluorene was obtained (yield: 70%).

(1-3) Synthesis of 9,9-bis(methoxymethyl)fluorene

In an anhydrous atmosphere, 30 ml of tetrahydrofuran (THF), 11.3 g of 9,9-bis(hydroxymethyl)fluorene, and 31.1 ml of $CH_3I$ were introduced in a 100 ml flask in this order. While the resultant mixture was under agitation at ambient temperature, 4 g of NaH at 60% by mass in mineral oil was added in a period of 2 hours and 30 minutes. The content was then allowed to react for 1 hour and 30 minutes. The resultant reactant was distilled to recover the non-reacted $CH_3I$, and the remaining content was diluted with 100 ml of water. The resultant floating solid was filtered and dried under vacuum at 40° C. The dried resultant was crystallized by ethanol, 11.3 g of 9.9-bis(methoxymethyl)fluorene being obtained (yield: 90%).

(2) Polymerization

A solid catalyst component comprising triethyl aluminum and the micro spheroidal $MgCl_2.2.1\ C_2H_5OH$ which was prepared by the method shown in Example 1 of J.P. KOKAI No. 9-020803; propylene polymer; and hydrogen used for adjusting MFR were continuously poured into a 290 liter loop type polymerization bath to prepare the polypropylene (A). Specific procedures are stated as follows.

225 ml of $TiCl_4$ was introduced in a 500 ml cylindrical glass reactor equipped with a filtering barrier at 0° C. Further 10.1 g (54 mmoles) of the above-mentioned micro spheroidal $MgCl_2.2.1\ C_2H_5OH$ was introduced therein under agitation in a period of 15 minutes. Thereafter, the temperature was brought to 70° C., and 9 mmoles of 9,9-bis(methoxymethyl)fluorene were introduced. The temperature was increased to 100° C. and, after 2 hours, the $TiCl_4$ was removed by filtration. 200 ml of $TiCl_4$ and 9 mmoles of 9,9-bis(methoxymethyl)fluorene were added to the obtained filtrated liquid. After heating the content for 1 hour at 120° C., the content was filtered again. Thereafter, another 200 ml of $TiCl_4$ was added to the obtained filtrated liquid, the treatment being continued at 120° C. for one more hour. Finally, the content was filtered and washed at 60° C. with n-heptane until all chlorine ions disappeared from the filtrated liquid. The solid catalyst component obtained in this manner contains Ti=3.5% by mass and 9,9-bis (methoxymethyl)fluorene=16.2% by mass.

70 ml of anhydrous n-hexane containing 7 mmoles of aluminum triethyl and 4 mg of the solid catalyst component prepared as described above were introduced in a 4 liter autoclave, which had been previously purged with gaseous propylene at 70° C. for 1 hour, at ambient temperature in a propylene current. The autoclave was closed, and 1.7 N litters of hydrogen and 1.2 kg of liquid propylene were introduced. The agitator was put in motion, and the temperature was then increased to 70° C. during a period of 5 minutes. After 2 hours at 70° C., the agitation was interrupted, the non-polymerized monomer was removed, and the content was cooled to ambient temperature. 380 g of polypropylene were discharged from the autoclave. The obtained polypropylene had 2.3% by mass of a fraction soluble in boiling p-xylene at 25° C. and 4.5 g/10 min. of a melt index.

The polypropylene obtained by the above-mentioned method was fed until triethyl aluminum was present at 60 mol ppm of molar fraction based on a propylene monomer. While keeping 4.5 MPa of a pressure and 70° C. of a temperature during the polymerization, the polymerization was continuously carried out at 20 kg/hour of a preparation speed. The obtained homopolypropylene was discharged from the polymerization bath and the non-reacted monomer was removed at a flash drum. Then through exposing it to steam to inactivate a catalyst and drying it, the resultant was gathered as a sample.

During the polymerization, hydrogen was introduced until the concentration of hydrogen in a system had become in the range of 8000 to 15000 mol ppm based on the non-reacted propylene molymer. The polypropylene (A-1) which is a crystalline homo-polypropylene having 1500 g/10 min. of MFR and 1.1% by mass of a fraction soluble in boiling p-xylene was then obtained.

The polypropylene (A-2) which is a crystalline homopolypropylene having 30 g/10 min. of MFR and 1.2% by mass of a fraction soluble in boiling p-xylene was also obtained by the same method as that for obtaining the polypropylene (A-1) except that the concentration of hydrogen in a system was 200 molppm. In this connection, the polypropylene (A-2) is a comparative example of the present invention.

[B] Preparation of the Propylene (B)

A solid catalyst used in the polymerization was a Ziegler-Natta catalyst having a high stereoregularity. This catalyst was obtained by supporting 2.5% by mass of Ti and diisobutyl phthalate used for an internal donor on $MgCl_2$, by the method disclosed in EP 674991 B, which document is incorporated herein by reference.

(1) Catalyst System and Pre-Polymerization

The above-mentioned solid catalyst was in contact with a mixture of triethyl aluminum (TEAL) and dicyclopentyl methoxysilane (DCPMS) at −5° C. for 5 minutes, while TEAL/DCPMS=15 wt/wt and TEAL/Ti=65 mol/mol. Before carrying out the polymerization in a first reactor, the obtained catalyst system was suspended in a liquid propylene at 20° C. for 20 minutes.

(2) Polymerization

The polymerization was carried out by using a two-step gas phase reactor equipped with an apparatus which can transfer a polymerized polymer moiety to a next reactor immediately. The polypropylene homopolymer was obtained by a first reactor where a propylene gas was continuously fed to the catalyst system prepared by the above mentioned method in (1) and hydrogen (used for controlling a molecular weight) at a constant speed. Hydrogen and propylene monomer were continuously analyzed and fed to keep the concentration of each component above constant in the reactor. The polymerization temperature was 70° C. and a feed ratio of hydrogen/propylene was 0.06 mol/mol. Thereby the crystalline homopolypropylene ($B^1$) was obtained.

A non-reacted monomer was removed from the crystalline homopolypropylene ($B^1$), which was obtained from the first reactor, in a constant flow rate. The crystalline homopolypropylene ($B^1$) were introduced in the second reactor together with hydrogen, propylene and ethylene gas in a constant flow rate. The ethylene-propylene copolymer ($B^2$) was polymerized at 60° C. of the polymerization temperature, 0.39 mol/mol of a feed ratio of (ethylene)/(ethylene+propylene) and 0.09 mol/mol of a feed ratio of hydrogen/propylene.

The resultant polymer particle present in the second reactor was treated by steam in order to remove a reactive monomer and volatile portions from said polymer particle, and then the polypropylene (B-1) was obtained.

The polypropylene (B-2) was obtained by the same method as that for obtaining the polypropylene (B-1) except that, in the second reactor, a feed ratio of (ethylene)/(ethylene+propylene) was 0.24 mol/mol and a feed ratio of hydrogen/propylene was 0.24 mol/mol. In this connection, the polypropylene (B-2) is a comparative example of the present invention.

The specific properties of the obtained polypropylenes (B-1) and (B-2) are shown in the following Table 1.

TABLE 1

|  | Polypropylene (B-1) | Polypropylene (B-2) |
| --- | --- | --- |
| The crystalline homopolypropylene ($B^1$) | | |
| The content in the component (B) (% by mass) | 45 | 50 |
| MFR(g/10 min.) | 150 | 150 |
| Fraction soluble in boiling p-xylene | 1.0 | 1.2 |
| The ethylene-propylene copolymer rubber ($B^2$) | | |
| The content in the component (B) (% by mass) | 55 | 50 |
| Ethylene content in the component ($B^2$) (% by mass) | 56 | 35 |
| Intrinsic viscosity [η] at 135° C. in decalin (dl/g) | 4.5 | 2.5 |

* MFR(melt flow rate) was determined by using a pellet-form test specimen, at a temperature of 230° C. and a load value of 21.6 N, based on JIS K7210.
* The fraction soluble in boiling p-xylene was determined by extracting 5 g of a crystalline homopolypropylene by a boiling p-xylene with Soxhlet extraction, allowing a filtrated liquid at 20° C. for one whole day and night, adding acetone to the filtrated liquid to raise deposition, and filtering and drying the deposited substance to measure the mass of the resultant dry substance (=W1(g)). The fraction soluble in boiling p-xylene (%) is calculated based on the following formula (I).
A fraction soluble in boding p-xylene (%) = (W1/5) × 100 (I)

[C] Preparation of the Polypropylene

A solid catalyst used in the polymerization is a Ziegler-Natta catalyst having a high stereoregularity, which is the same catalyst as that used in the propylene (B). This catalyst was obtained by supporting 2.5% by mass of Ti and diisobutyl phthalate used for an internal donor on $MgCl_2$, by the method disclosed in EP 674991 B.

(1) Catalyst System and Pre-Polymerization

The above-mentioned solid catalyst was in contact with a mixture of triethyl aluminum (TEAL) and dicyclopentyl methoxysilane (DCPMS) at −5° C. for 5 minutes, while TEAL/DCPMS=15 wt/wt and TEAL/Ti=65 mol/mol. Before carrying out the polymerization in a first reactor, the obtained catalyst system was suspended in a liquid propylene at 20° C. for 20 minutes.

(2) Polymerization

The polymerization was carried out by using a two-step gas phase reactor equipped with an apparatus which can transfer a polymerized polymer moiety to a next reactor immediately. The polypropylene homopoymer was obtained by a first reactor where a propylene gas was continuously fed to the pre-prepared catalyst system and hydrogen (used for controlling a molecular weight) in a constant speed. Hydrogen and propylene monomer were continuously analyzed and fed to keep the concentration of each component above constant in the reactor. The polymerization temperature was 65° C. and a feed ratio of hydrogen/propylene was 0.002 mol/mol. Thereby the crystalline homopolypropylene ($C^1$) was obtained.

A non-reacted monomer was removed from the crystalline homopolypropylene ($C^1$), which was obtained from the first reactor, in a constant flow rate. The crystalline homopolypropylene ($C^1$) were introduced in the second reactor together with hydrogen, propylene and ethylene gas in a constant flow rate. The ethylene-propylene copolymer ($C^2$) was polymerized at a polymerization temperature of 75° C., a feed ratio of (ethylene)/(ethylene+propylene) 0.25 mol/mol and a feed ratio of hydrogen/propylene 0.006 mol/mol.

A non-reacted monomer was removed from the polymer component obtained from the second reactor in a constant flow rate. This polymer component was introduced in a third reactor, together with hydrogen and propylene in a constant flow rate. The crystalline homopolypropylene ($C^1$) was further polymerized at a polymerization temperature of 75° C. and a feed ratio of hydrogen/propylene 0.644 mol/mol.

The resultant polymer particle present in the third reactor was treated by steam in order to remove a reactive monomer and volatile portions from said polymer particle, and then the polypropylene (C-1) was obtained.

The polypropylene (C-2) was obtained by the same method as that for obtaining the polypropylene (C-1) except that, in the first reactor, a feed ratio of hydrogen/propylene was 0.01 mol/mol; in the second reactor, a feed ratio of (ethylene)/(ethylene+propylene) was 0.14 mol/mol and a feed ratio of hydrogen/propylene was 0.003 mol/mol; and in the third reactor, a feed ratio of hydrogen/propylene was 0.400 mol/mol. In this connection, the polypropylene (C-2) is a comparative example of the present invention.

The specific properties of the obtained polypropylenes (C-1) and (C-2) are shown in the following Table 2.

TABLE 2

| | Polypropylene (C-1) | Polypropylene (C-2) |
|---|---|---|
| The crystalline homopolypropylene ($C^1$) | | |
| The content in the component (C) (% by mass) | 32 | 30 |
| MFR(g/10 min.) | 1.5 | 7.1 |
| Fraction soluble in boiling p-xylene | 1.5 | 1.5 |
| The ethylene-proylene copolymer rubber ($C^2$) | | |
| The content in the component (C) (% by mass) | 35 | 37 |
| Ethylene content in the component ($C^2$) (% by mass) | 40 | 22 |
| Intrinsic viscosity [η] at 135° C. in decalin (dl/g) | 7.6 | 4.0 |
| The crystalline homopolypropylene ($C^1$) | | |
| The content in the component (C) (% by mass) | 33 | 33 |
| MFR(g/10 min.) | 600 | 400 |
| Fraction soluble in boiling p-xylene | 1.5 | 1.5 |
| MFR of the whole component (C) (g/10 min.) | 1.6 | 5.2 |

* MFR(melt flow rate) was determined by the same method as that in Table 1.

[2] Availability and Characteristics of the components (D) to (I)

Availability and characteristics of the components (D) to (I) used in the present examples are shown in the following Table 3.

TABLE 3

| | |
|---|---|
| (D) | Ethylene-propylene copolymer rubber (Sunallomer Corp.) an ethylene content = 73% by mass MFR = 0.02 g/10 min. CSD = 1.2 |
| (E) | Talc (5000SA, Hayashi Kasei Corp.) an average particle size = 2.5 μm an aspect ratio = 4.0 |
| (F) | Lubricant neutron oleic acid amide (NOF Corp.) |
| (G) | Hydrogenated styrene · butadiene · styrene triblock copolymer styrene:butadiene:styrene (mass ratio) = 5:7:15 (KRATON G1657, KRATON Polymer Japan) |
| (H) | Other polymer components homopolypropylene (PWB02N, Sunallomer Corp.) |
| (I) | Other components Nucleating agent |
| | sodium-2,2'methylenebis(4,6-di-t-butylphenyl)phosphate (NA11, Asahi Denka Co., Ltd.) Antioxidant |
| | a mixture of tetrakis]methylene-3-(3',5'-di-t-butyl-4'-hydroxyphenyl)propionate]methane and tris(2,4-di-t-butylphenyl)phosphite in the mass ratio if 1:1 (Irganox B225, Ciba-Geigy) Light stabilizer |
| | tetrakis(1,2,2,6,6-pentamethyl-4-piperidyl)-1,2,3,4-butanetetracarboxylate. (LA502XP, Asahi Denka Co., Ltd.) Antistatic agent |
| | stearic acid monoglyceride (TS-5, Kao Corp.) |

In Table 3 above, CSD was calculated from the following formula (II).
$$CSD = ((2P_E \cdot P_\alpha)/(P_{E\alpha})^2) \quad (II)$$

Wherein $P_E$ is an ethylene content determined from dyad linkage (molar fraction); $P_\alpha$ is α-olefin content determined from dyad linkage (molar fraction); and $P_{E\alpha}$ is a molar fraction of the ethylene-α-olefin alternating linkage. Each value of $P_E$, $P_\alpha$ and $P_{E\alpha}$ is determined by homogeneously dissolving 200 mg of the ethylene-α-olefin copolymer rubber in 2 ml of a mixed solvent including 1,2,4-trichlolobenzene and deuterated benzene (in a volume ratio of 9:1) in a 10 mm φ test tube, and determining its $^{13}$C-NMR spectra by JNM-EX270 (JEOL, Ltd.) under the condition; a measurement temp.: 120° C., a measurement frequency: 100.50 MHz, a pulse separation: 3.8 sec.: integralting times: 5,000 times.

Example 1

The above-mentioned components were mixed in the ratio shown in Table 4 to prepare the polypropylene resin composition of Example 1. Specifically, the components shown in Table 4 were mixed under agitation by using a Henschel mixer at 600 rpm for 2 minutes. Thereafter, the resultant was kneaded and granulated by a twin screw extruder (KTX-30, Kobe Steel, Ltd.) a cylinder temperature of at 180° C., revolution of 350 rpm and discharge rate of 30 kg/h, to form the polypropylene resin composition of Example 1.

Examples 2 to 5 and Comparative Examples 1 to 3

The polypropylene resin compositions of Examples 2 to 5 and Comparative examples 1 to 3 were prepared by the same method as that of Example 1 except for mixing each of the components in the ratio shown in Table 4.

under the condition of a temperature of 23° C., a span of 60 mm and a flexing speed of 2.0 mm/min., based on JIS K7171. The flexural modulus is suitably 1800 MPa or more, preferably 2000 MPa or more.
(ii) IZOD Impact Test The IZOD impact value of the obtained test specimen was determined with the test specimen (12.7(width)×4.0 (thickness)×64 mm(length)) based on JIS K7110, which test specimen was further subjected to a notch processing by machine cutting. The IZOD impact value is suitably 10 kg/m² or more, preferably 13 kg/m² or more.
(iii) Deflection Temperature Under Load The deflection temperature under load of the obtained test specimen (12.7(width)×4.0(thickness)×127 mm(length)) was determined under the condition of a load value of 0.46 MPa, a temperature of 30 to 160° C. and a temperature increase rate of 2° C./min., based on JIS K7191. The deflection temperature under load is suitably 100° C. or more, preferably 110° C. or more.
(2) Spiral Flow Length In order to evaluate flowability of the polypropylene resin composition of the above mentioned Examples and Comparative examples, a spiral flow length was determined by an injection molding machine (J100E-P, Japan Steel Works, Ltd.) and a spiral flow mold having a thickness of 3 mm. Specifically, a flow length at a spiral flow mold was deter-

TABLE 4

Composition of the polypropylene resin composition

|  | Example 1 | Example 2 | Example 3 | Example 4 | Example 5 | Comparative Example 1 | Comparative Example 2 | Comparative Example 3 |
|---|---|---|---|---|---|---|---|---|
| (A-1) (% by mass) | 20 | 20 | 20 | 20 | 20 | 20 |  | 20 |
| (A-2) (% by mass) |  |  |  |  |  |  | 20 |  |
| (B-1) (% by mass) | 18 | 12 | 13 | 13 | 5 | 18 | 18 |  |
| (B-2) (% by mass) |  | 6 |  |  |  |  |  | 18 |
| (C-1) (% by mass) | 5 | 5 | 10 | 5 | 18 | 5 | 5 | 5 |
| (C-2) (% by mass) |  |  |  | 5 |  |  |  |  |
| (D) (% by mass) | 10 | 10 | 10 | 10 | 10 | 10 | 10 | 10 |
| (E) (% by mass) | 23 | 23 | 23 | 23 | 23 | 23 | 23 | 23 |
| (G) (% by mass) | 4 | 4 | 4 | 4 | 4 | 4 | 4 | 4 |
| (H) (% by mass) | 20 | 20 | 20 | 20 | 20 | 20 | 20 | 20 |
| (F) (part by mass) | 0.3 | 0.3 | 0.3 | 0.3 | 0.3 |  | 0.3 | 0.3 |
| (I) (part by mass) |  |  |  |  |  |  |  |  |
| nucleating agent | 0.1 | 0.1 | 0.1 | 0.1 | 0.1 | 0.1 | 0.1 | 0.1 |
| antioxidant | 0.2 | 0.2 | 0.2 | 0.2 | 0.2 | 0.2 | 0.2 | 0.2 |
| light stabilizer | 0.2 | 0.2 | 0.2 | 0.2 | 0.2 | 0.2 | 0.2 | 0.2 |
| antistatic agent | 0.2 | 0.2 | 0.2 | 0.2 | 0.2 | 0.2 | 0.2 | 0.2 |

* A content of the components (A) to (H) other than the component (F) is shown as % by mass based on 100% by mass of the total content of all the components (A) to (H) other than the component (F).
* A content of the components (F) and (I) is shown as part by mass based on 100 parts by mass of the total amount of the components (A) to (H).

(1) Evaluation for Physical Properties

The test specimen for determining mechanical properties of the polypropylene resin composition of the above mentioned Examples and Comparative examples was prepared to evaluate physical properties thereof. The test specimen was prepared by using an injection molding machine (Funac α 100C, FANAC, Ltd.) and a mold for the test specimen, under the molding condition of a cylinder temperature of 200° C.; the mold temperature of 40° C.; injection pressure of 50 MPa; and a cooling time of 20 seconds. The obtained test specimen was subject to the following examination for evaluating physical properties.
(i) Flexural Modulus A flexural modulus of the obtained test specimen (12.7 (width)×4.0(thickness)×127 mm(length)) was determined mined under the condition of a cylinder temperature of 170° C., the mold temperature of 40° C., injection pressure of 93 MPa and a cooling time of 20 seconds. When the flow length is 80 cm or more, preferably 90 cm or more, a good flowability of the propylene resin composition is obtained.
(3) Evaluation of an Appearance (Part 1)

The test flat plate of the polypropylene resin composition of the above mentioned Examples and Comparative examples was prepared to evaluate an appearance thereof. The test flat plate was prepared by using the IS150 injection molding machine (Toshiba Machine Co., Ltd.) under the molding condition of a cylinder temperature of 210° C., the mold temperature of 40° C., an injection time of 11 seconds and a cooling time of 20 seconds. The appearance was evaluated with the obtained test flat plate (300(vertical)× 140(horizontal)×3 mm(thickness)), as follows.

(i) Gloss Value

The gloss value of the obtained test flat plate was determined at an angle of 60° between an entry angle and reflection angle, based on JIS K7105. The gloss value is suitably 30% or less, preferably 28% or less.

(ii) Evaluation of Flow Mark

By observing the flat plate of the polypropylene resin composition molded by the IS150 injection molding machine (Toshiba Machine Co., Ltd.), the flow mark was evaluated from the viewpoint of (a) the starting point of developing the flow mark from the gate of the machine, and (b) remarkability of the flow mark measured by visual determination. The evaluation was judged from the value calculated from (the developing point)×(the evaluation by visual evaluation). When this calculated value is 90 or more, it is suitable for interior parts of a car of the present invention. In this connection, the remarkability of the flow mark was evaluated following four steps.

4: No flow mark, or the flow mark is hardly remarkable.
3: The flow mark is not remarkable
2; The flow mark is slightly remarkable
1; The flow mark is remarkable.

(4) Evaluation of an Appearance (Part 2)

In order to evaluate an appearance of the polypropylene resin composition of the above mentioned Examples and Comparative examples, a die-swell ratio was determined. The die-swell ratio at a shear rate of $\gamma=200$ s$^{-1}$ was determined on the basis of an internal diameter of an orifice by using a capillary rheometer (Capirograph 1B, Toyo Seiki Seisaku-sho, Ltd.). Specifically, at a cylinder temperature of 200° C. and L(length of the orifice)/D(internal diameter of the orifice)=40, the shear rate was varied from 50 to 50,000 s$^{-1}$. When the die-swell ratio at a shear rate of $\gamma=200$ s$^{-1}$ is 1.15 or more, preferably 1.20 or more, the gas discharging ability and mold adhesiveness were improved, and embossed pattern transcription ability was enhanced, whereby a good appearance for interior parts of a car of the present invention can be achieved.

(5) Evaluation of Scratch Resistance

The test flat plate of the polypropylene resin composition of the above mentioned Examples and Comparative examples was prepared to evaluate scratch resistance. The test flat plate was prepared by using the IS150 injection molding machine (Toshiba Machine Co., Ltd.) under the molding condition of a cylinder temperature of 210° C., the mold temperature of 40° C., an injection time of 11 seconds and a cooling time of 20 seconds. #540, embossed pattern included, 300(vertical)×140(horizontal)×3 mm(thickness) mold (TANAZAWA HAKKOSHA Co., Ltd.) was used for the mold. The evaluation was carried out with the flat plate and a tab jig as shown below. Rectangle shaped scratches were formed on the flat plate in 1 mm pitch under the following conditions. 5 monitors evaluated the flat plate by visual determination. When an average of the evaluating points from the 5 monitors was 3 points or more, the flat plate was judged as acceptable.

<Tab Jig>

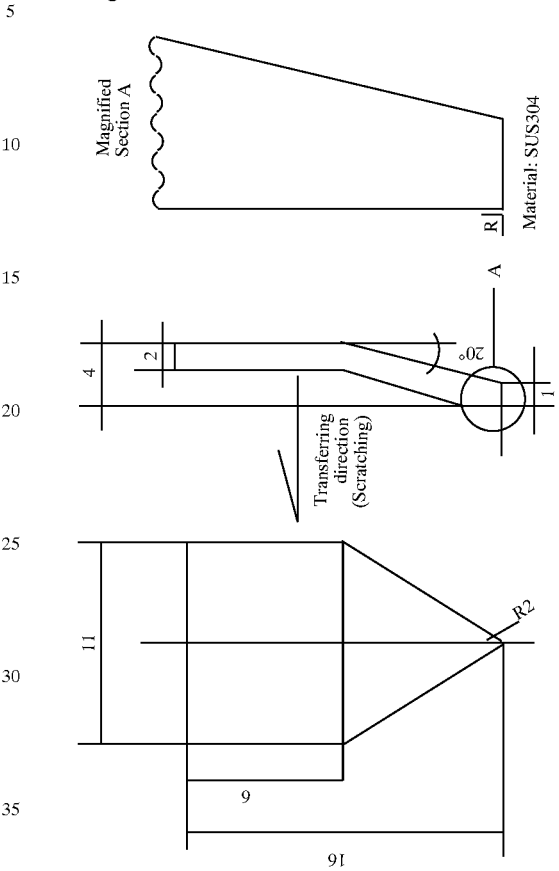

<Scratching Condition>
Load: 500 g
Speed: 550 mm/min.
Stroke: 50 mm
pitch: 180° revolution (1.0 mm)
scratch times: 17 (17 mm width) or more <Judgement and Evaluating Points>
5 points: No gloss enhancement
4 points: Slightly gloss enhancement
3 points: Gloss enhancement
2 points: Remarkable gloss enhancement
1 point: Namely, remarkable gloss enhancement The results of the evaluations (1) to (5) are shown in Table 5.

TABLE 5

Evaluation of the polypropylene resin composition

|  | Example 1 | Example 2 | Example 3 | Example 4 | Example 5 | Comparative Example 1 | Comparative Example 2 | Comparative Example 3 |
|---|---|---|---|---|---|---|---|---|
| Flexural modulus (MPa) | 2100 | 2260 | 2060 | 2130 | 1900 | 2120 | 2230 | 1760 |
| IZOD impact value (kg/m$^2$) | 30.5 | 33.2 | 43.2 | 34.5 | 45.9 | 33.5 | 12.3 | 36.5 |
| Deflection temperature under load (° C.) | 118 | 120 | 115 | 117 | 116 | 119 | 122 | 101 |
| Spiral flow length (MPa) | 92 | 90 | 98 | 83 | 93 | 94 | 70 | 92 |
| Gloss value (%) | 20 | 28 | 29 | 27 | 20 | 34 | 22 | 38 |

TABLE 5-continued

Evaluation of the polypropylene resin composition

|  |  | Example 1 | Example 2 | Example 3 | Example 4 | Example 5 | Comparative Example 1 | Comparative Example 2 | Comparative Example 3 |
|---|---|---|---|---|---|---|---|---|---|
| Flow mark | Developing point (cm) | 23.9 | 22.4 | 25.5 | 17.5 | 26.8 | 21.5 | 16.0 | 13.5 |
|  | Evaluation | 4 | 3 | 3 | 3 | 4 | 3 | 3 | 2 |
|  | (Developing point) X (Evaluation) | 95.6 | 67.2 | 76.5 | 52.5 | 107.2 | 64.5 | 48.0 | 27.0 |
| Die-swell ratio (200 s$^{-1}$) |  | 1.20 | 1.18 | 1.35 | 1.16 | 1.36 | 1.11 | 1.10 | 1.12 |
| Scratch resistance |  | 3.8 | 3.1 | 3.0 | 3.1 | 3.0 | 2.3 | 3.1 | — |

EFFECTS OF THE PRESENT INVENTION

As mentioned above, by using a crystalline homopolypropylene having a high melt flow rate as a base material, the polypropylene resin composition of the present invention has an improved flowability during injection molding. By using ethylene-α-olefin copolymer, a high-impact property of a physical property of the crystalline homopolypropylene is improved. By adding two kinds of crystalline ethylene-propylene copolymer containing a crystalline homopolypropylene and ethylene-propylene copolymer rubber, wherein an ethylene content of one crystalline ethylene-propylene copolymer is different from that of the other, the present invention can keep a good compatibility with a crystalline homopolypropylene as well as achieve a good balance between a gloss, scratch resistance and a high-impact property. The present composition is novel based on a newly combination of the components thereof. The polypropylene resin component of the present invention has a superior molding property (injection molding, compression molding and gas-assist molding) as well as a appropriate balance between physical properties. The molded article consisting of the polypropylene resin component of the present invention has an excellent appearance, lower gloss and scratch resistance. Therefore, the polypropylene resin component of the present invention is suitable for materials including auto parts such as electric appliances, office automation equipments, motorcycles, automobiles, air planes, where lower gloss and scratch resistance are especially required.

What is claimed is:

1. A molded article for interior parts of a car comprising a polypropylene resin composition comprising the following components (A) to (D) wherein a total amount of the components (A) to (D) is 100% by mass or less:

Polypropylene (A):
  5.0 to 30% by mass of a crystalline homopolypropylene having an MFR of 500 to 3,000 g/10 min. determined by a melt flow rate measurement at 230° C. under 21.6 N load and a fraction soluble in boiling p-xylene of 6.0% by mass or less;

Polypropylene (B):
  10 to 50% by mass of a polypropylene comprising a crystalline homopolypropylene (B$^1$) and an ethylene-propylene copolymer rubber (B$^2$), said ethylene-propylene copolymer rubber (B$^2$) having an intrinsic viscosity of 4.0 to 7.0 dl/g at 135° C. in decalin and a content of ethylene of 45% by mass to 80% by mass, and said polypropylene (B) comprising said ethylene-propylene copolymer rubber (B$^2$) in an amount of at least 10% by mass;

Polypropylene (C):
  5.0 to 30% by mass of a polypropylene comprising a crystalline homopolypropylene (C$^1$) and an ethylene-propylene copolymer rubber (C$^2$) said ethylene-propylene copolymer rubber (C$^2$) having an intrinsic viscosity of 5.0 to 10 dl/g at 135° C. in decalin and a content of ethylene of from 25% by mass or more to below 45% by mass, and said polypropylene (C) comprising said ethylene-propylene copolymer rubber (C$^2$) in an amount of at least 10% by mass;

Ethylene-α-olefin copolymer rubber (D):
  5.0 to 40% by mass of an ethylene-α-olefin copolymer rubber having an MFR of 0.1 to 1.0 g/10 min. as determined by a melt flow rate measurement at 230° C. and 21.6 N load, a content of ethylene of 50% by mass to 80% by mass, and a comonomer sequencing distribution of 1.0 to 2.0 determined by $^{13}$C-NMR.

2. The molded article of claim 1, further comprising 10 to 30% by mass of an inorganic filler (E) so that the total amount of the components (A) to (E) is not more than 100% by mass.

3. The molded article of claim 1, further comprising 0.01 to 2.0 parts by mass of a lubricant (F) based on 100 parts by mass of the total amount of the components (A) to (D).

4. The molded article of claim 2, further comprising 0.01 to 2.0 parts by mass of a lubricant (F) based on 100 parts by mass of the total amount of the component (A) to (E).

5. The molded article of claim 2 wherein the component (E) is a talc.

6. The molded article of claim 3 wherein the component (F) is a fatty acid amide or derivative thereof.

7. The molded article of claim 1 having a flexural modulus of 1,800 MPa or more as determined by JIS K7171, IZOD impact value of 10 kJ/m$^2$ or more as determined by JIS K7110 at 10° C., and a deflection temperature under load of 100° C. or more as determined by JIS K7191 under 0.46 MPa load.

8. The molded article of claim 1 having a flow length of 80 cm or more as determined by a spiral flow mold having a thickness of 3 mm under the injection molding condition at 170° C. of an cylinder temperature and 93 MPa of an injection pressure.

9. The molded article of claim 1 having a die-swell ratio at shear rate of γ=200 s$^{-1}$ of 1.15 or more as determined by using a capillary rheometer using L/D=40 capillary at cylinder temperature of 210° C.

10. The molded article of claim 1 wherein a gloss value 30% or less as determined by JIS 7105 at an angle of 60° between entry angle and reflection angle.

11. The molded article of claim 1 wherein the polypropylene (A) comprises a crystalline homopolypropylene having an MFR of 1,000 to 2,000 g/10 min. determined by a melt flow rate measurement at 230° C. under 21.6 N load and a fraction soluble in boiling p-xylene of 0.1 to 2.0% by mass or less.

12. The molded article of claim 1 wherein said ethylene-propylene copolymer rubber ($B^2$) has an intrinsic viscosity of 4.0 to 5.5 dl/g at 135° C. in decalin and a content of ethylene of 50 to 60% by mass, and said polypropylene (B) comprising said ethylene-propylene copolymer rubber ($B^2$) in an amount of 15 to 40% by mass.

13. The molded article of claim 1 wherein said polypropylene (B) is prepared by two or more polymerization steps in a continuous multistage polymerization between said crystalline homopolypropylene ($B^1$) and said ethylene-propylene copolymer rubber ($B^2$), in which said crystalline homopolypropylene ($B^1$) is prepared in a first polymerization step or one thereafter.

14. The molded article of claim 1 wherein said ethylene-propylene copolymer rubber ($C^2$) has an intrinsic viscosity of 5.0 to 8.0 dl/g at 135° C. in decalin and a content of ethylene of from 35 to 40% by mass, and said polypropylene (C) comprising said ethylene-propylene copolymer rubber ($C^2$) in an amount of at least 15 to 40% by mass.

15. The molded article of claim 1 wherein said polypropylene (C) is prepared by two or more polymerization steps in a continuous multistage polymerization between said crystalline homopolypropylene ($C^1$) and said ethylene-propylene copolymer rubber ($C^2$), in which said copolymer rubber ($C^2$) has a property different from that of said ethylene-propylene copolymer rubber ($B^2$) used in said polypropylene (B).

16. The molded article of claim 1 wherein said ethylene-α-olefin copolymer rubber (D) is an ethylene-α-olefin copolymer rubber having an MFR of 0.1 to 0.6 g/10 min. as determined by a melt flow rate measurement at 230° C. and 21.6 N load, a content of ethylene of 55% by mass to 70% by mass, and a comonomer sequencing distribution of 1.1 to 1.7 determined by $^{13}$C-NMR.

17. The molded article of claim 1 wherein said ethylene-α-olefin copolymer rubber (D) is a copolymer rubber selected from the group consisting of an ethylene-propylene copolymer rubber, an ethylene-butene copolymer rubber, an ethylene-hexene copolymer rubber and an ethylene-octene copolymer rubber.

18. The molded article of claim 1 wherein said ethylene-α-olefin copolymer rubber (D) is an ethylene-propylene copolymer rubber.

19. The molded article of claim 1 comprising a polypropylene resin composition comprising 10 to 20% by mass of said polypropylene (A), 15 to 40% by mass of said polypropylene (B), 5.0 to 20% by mass of said polypropylene (C) and 10 to 30% by mass of said ethylene-α-olefin copolymer rubber (D) wherein a total amount of these components (A) to (D) is 100% by mass or less.

20. The molded article of claim 1 further comprising one or more components selected from the group consisting of a nucleating agent, an antioxidant, an hydrochloric acid absorbent, a light stabilizer, a heat resistance stabilizer, an UV absorbent, an antistatic agent, a fire retardant, a pigment, a colorant, a dispersant, a cuprous damage inhibitor, a corrector, a plasticizer, a blowing agent, a bubble inhibitor, a cross-linker and peroxides.

* * * * *